United States Patent
Lupo et al.

(10) Patent No.: US 7,347,175 B2
(45) Date of Patent: Mar. 25, 2008

(54) METHOD FOR MANAGING THE "STOP-AND-START" MODE IN A MOTOR VEHICLE EQUIPPED WITH AN INTERNAL COMBUSTION ENGINE

(75) Inventors: Savino Luigi Lupo, Bologna (IT); Michele Pennese, Medicina (IT)

(73) Assignee: Magneti Marelli Powertrain S.p.A., Corbetta (IT)

( * ) Notice: Subject to any disclaimer, the term of this patent is extended or adjusted under 35 U.S.C. 154(b) by 191 days.

(21) Appl. No.: 11/300,003

(22) Filed: Dec. 13, 2005

(65) Prior Publication Data

US 2006/0150937 A1    Jul. 13, 2006

(30) Foreign Application Priority Data

Dec. 23, 2004   (IT)   .......................... BO2004A0801

(51) Int. Cl.
| F02N 11/08 | (2006.01) |
| F02N 11/04 | (2006.01) |
| F02N 17/00 | (2006.01) |
| F02D 45/00 | (2006.01) |

(52) U.S. Cl. ................................. 123/179.4
(58) Field of Classification Search ............. 123/179.3, 123/179.4
See application file for complete search history.

(56) References Cited

U.S. PATENT DOCUMENTS

| 4,677,941 A | | 7/1987 | Kurz | |
| 5,072,703 A | * | 12/1991 | Sutton | ...................... 123/179.4 |
| 6,358,180 B1 | | 3/2002 | Kuroda et al. | |
| 6,453,865 B2 | * | 9/2002 | Hirose et al. | ............. 123/179.4 |
| 6,722,332 B2 | * | 4/2004 | Kojima | ..................... 123/179.3 |
| 6,748,750 B2 | * | 6/2004 | Choi | .......................... 62/115 |
| 6,793,059 B2 | * | 9/2004 | Okada et al. | .............. 192/84.1 |
| 7,027,912 B1 | * | 4/2006 | Metzger | ..................... 701/112 |
| 7,107,956 B2 | * | 9/2006 | McGee et al. | ............ 123/179.3 |
| 7,136,762 B2 | * | 11/2006 | Ono | ............................ 702/63 |
| 2003/0029426 A1 | | 2/2003 | Surnilla et al. | |
| 2003/0173124 A1 | * | 9/2003 | Okada et al. | .............. 180/65.2 |
| 2003/0183191 A1 | | 10/2003 | Bertness et al. | |
| 2003/0224902 A1 | | 12/2003 | Kahlon et al. | |
| 2004/0214689 A1 | * | 10/2004 | Kaneko | ....................... 477/203 |
| 2006/0048988 A1 | * | 3/2006 | Dreibholz et al. | .......... 180/213 |
| 2006/0116797 A1 | * | 6/2006 | Moran | ......................... 701/22 |

FOREIGN PATENT DOCUMENTS

| DE | 103 00 178 A1 | 7/2004 |
| EP | 1 132 245 A2 | 9/2001 |

(Continued)

*Primary Examiner*—Stephen K. Cronin
*Assistant Examiner*—Arnold Castro
(74) *Attorney, Agent, or Firm*—Luce, Forward, Hamilton & Scripps LLP; Mitchell P. Brook, Esq.

(57) ABSTRACT

A method for managing the "stop-and-start" mode in a motor vehicle equipped with an internal combustion engine; the method provides for the "stop-and-start" mode to be enabled or disabled as a function of a state of charge (SOC) of a battery of the motor vehicle, as a function of a state of motion of a crankshaft of the internal combustion engine and as a function of the electric power consumed overall by the electrical consumers of the motor vehicle.

22 Claims, 3 Drawing Sheets

FOREIGN PATENT DOCUMENTS

| | | | |
|---|---|---|---|
| JP | 61156402 A * | 7/1986 | |
| JP | 06257482 | 9/1994 | |
| JP | 06307316 | 11/1994 | |
| JP | 08338276 | 12/1996 | |
| JP | 10325346 | 12/1998 | |

* cited by examiner

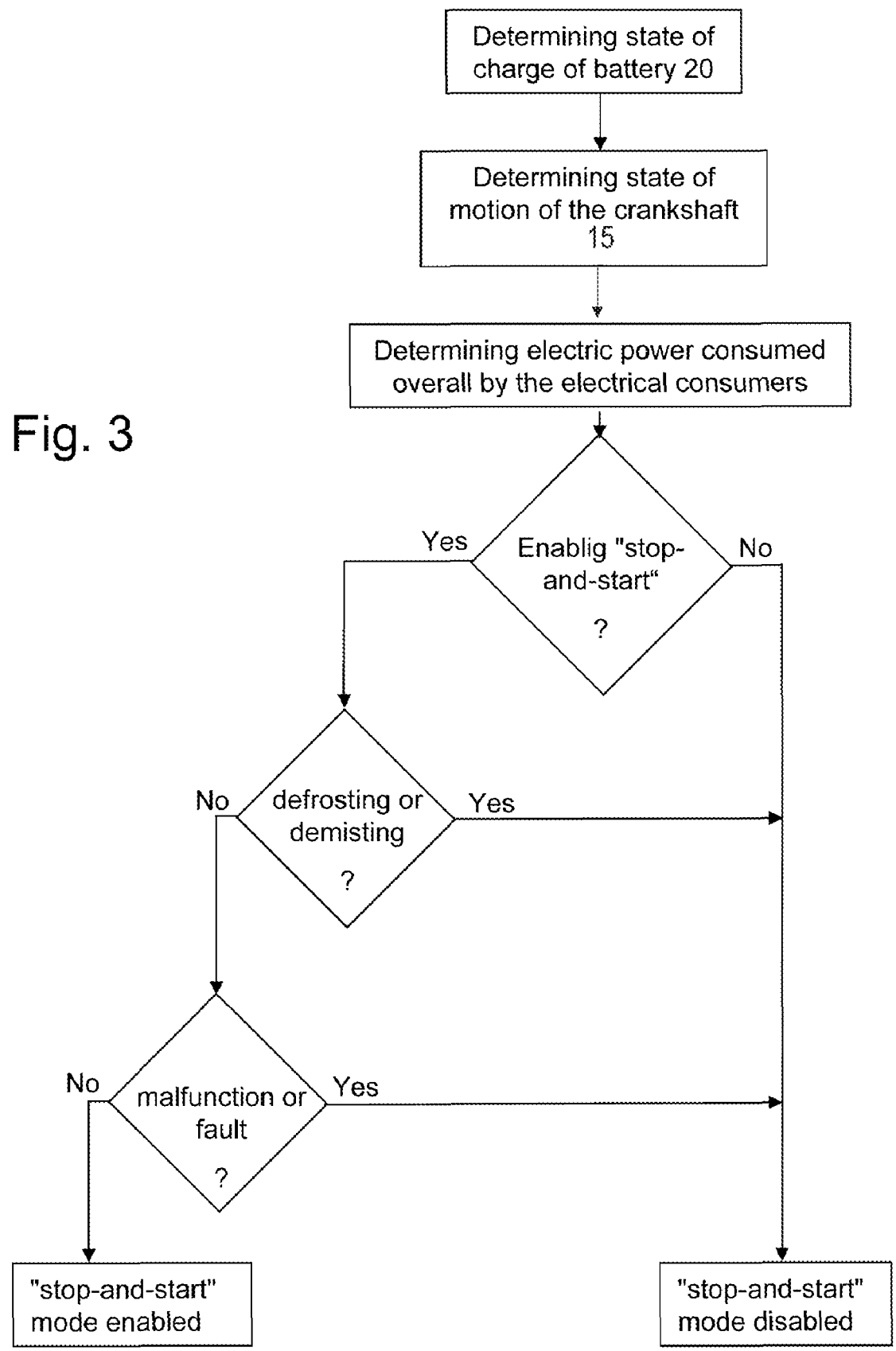

METHOD FOR MANAGING THE "STOP-AND-START" MODE IN A MOTOR VEHICLE EQUIPPED WITH AN INTERNAL COMBUSTION ENGINE

The present invention relates to a method for managing the "stop-and-start" mode in a motor vehicle equipped with an internal combustion engine (ICE).

BACKGROUND OF THE INVENTION

An internal combustion engine comprises a number of cylinders (usually four, arranged in line) provided with respective pistons connected to a cranked crankshaft by means of connecting rods; the shaft of an electric starter motor, which is powered by a battery of the motor vehicle, is also connected mechanically to the crankshaft of the internal combustion engine. In order to start the internal combustion engine, the electric motor sets the crankshaft in rotation from an initial position in which said crankshaft is stationary; as soon as the crankshaft begins to rotate, fuel is injected (directly or indirectly) into the cylinders in order to attempt to achieve a first explosion in the shortest possible time and so enable the internal combustion engine to become self-sustaining.

The "stop-and-start" mode provides for the internal combustion engine to be turned off when the vehicle is at rest or nearly stopped (typically for reasons associated with traffic, such as a red traffic light or a junction that does not have priority) and for the internal combustion engine to be restarted as soon as the driver presses on the accelerator.

During the starting phase, a considerable amount of electrical energy is consumed by the electric starter motor, which consequently places a great load on and entails considerable loss of electric charge in the battery of the motor vehicle. Obviously, when "stop-and-start" mode is activated, the battery of the motor vehicle is subjected to intensive use due to the high frequency at which the internal combustion engine is started, particularly when the motor vehicle is being driven in urban traffic.

US2003224902A1 discloses a method for automatic operation of a vehicle comprising an engine, a starter motor, an engine clutch, and a plurality of vehicle systems. After detecting that the engine is running, the vehicle systems are checked to ensure an acceptable status for shutting down the engine. A negative torque is applied to the engine to shut it down. Vehicle systems are monitored until they indicate that the engine should be restarted. The engine is restarted, and a successful start of the engine is then confirmed. Similarly, there is provided a method for the cold start of a vehicle as above. The starter motor is powered up with an initial torque and vehicle systems are monitored to determine whether the engine should be started. The engine is started from the torque of the starter motor, and a successful start of the engine is then confirmed.

US6358180B1 discloses an engine control system, which reduces driver's feeling of unease relating to the operation of driving a vehicle which is idle-controlled so as to reduce the exhaust gas discharge, thereby improving the driving operability. The method comprising the steps of detecting a switch of the driving mode of the vehicle from a first normal driving range to a second normal driving range different from the first normal driving range; detecting whether the engine is currently in a stopped state due to an automatic stop operation; detecting whether a brake for stopping the vehicle is currently being operated; and automatically starting the engine if it is determined that the engine is currently in a stopped state due to the automatic stop operation, and that the driving mode has been switched to the second normal driving range, and that the brake is not currently being operated.

JP10325346A1 discloses an automatic stop/start device of an internal combustion engine for a vehicle to prevent the engine from being not restarted because of shortage of a charged amount by controlling the automatic stop of the engine based on the detected value of the charged amount of a battery for supplying electricity to a starting dinamo-electric machine and the other auxiliaries and the estimated value of electric energy required to drive the auxiliaries for predetermined period.

JP06257482A1 discloses an automatic start/stop device for an internal combustion engine to surely prevent battery exhaustion by means of a simple and inexpensive constitution by detecting a current consumer in a vehicle and controlling to start an engine when the current consumer is generated during an engine stop so as to correspond to an alteration of program. A control part controls the engine so that it starts when a current consumer is generated while the engine stops; in this way, exhaustion of a battery can be surely prevented by means of simple and inexpensive constitution.

SUMMARY OF THE INVENTION

The aim of the present invention is to provide a method for managing the "stop-and-start" mode in a motor vehicle equipped with an internal combustion engine, which method allows the best possible use to be made of the battery capacity of the car and is simultaneously simple and economic to implement.

The present invention provides a method for managing the "stop-and-start" mode in a motor vehicle equipped with an internal combustion engine as recited in the attached claims.

BRIEF DESCRIPTION OF THE DRAWINGS

The present invention will now be described with reference to the attached drawings, which illustrate a non-limiting embodiment of the invention, in which:

FIG. 3 is a flowchart showing the steps of determining the state of charge ("SOC"), the state of motion, the electric power consumed, the decision points and the resulting actions of embodiments of the present invention.

DETAILED DESCRIPTION OF THE INVENTION

Figure 1:
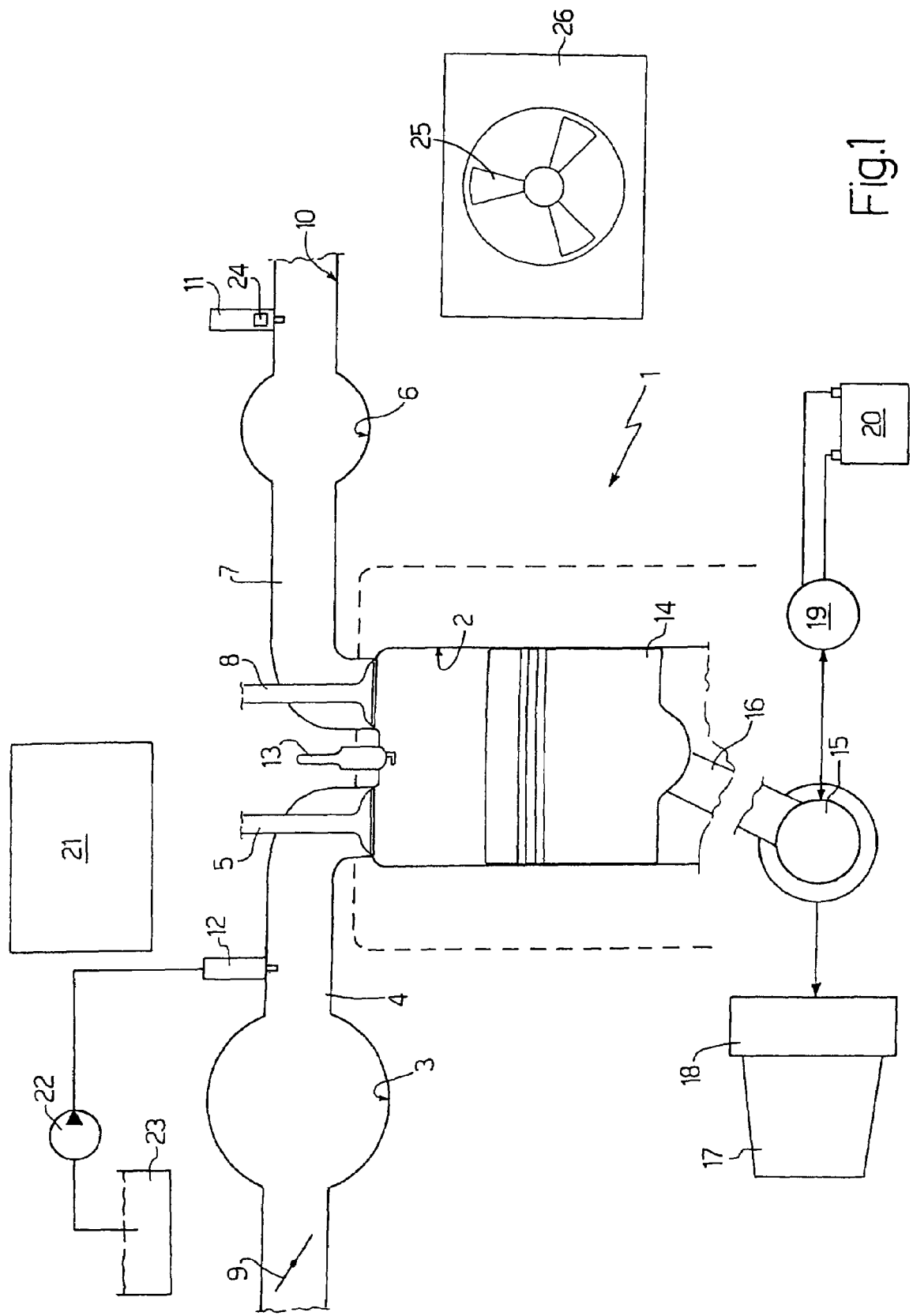
FIG. 1 is a schematic view of an internal combustion engine.

In FIG. 1, 1 denotes the overall internal combustion engine, which engine 1 comprises four cylinders 2 (only one of which is shown in FIG. 1) arranged in line. Each cylinder 2 is connected to an intake manifold 3 via a dedicated intake duct 4 controlled by at least one intake valve 5 and to an exhaust manifold 6 via a dedicated exhaust duct 7 controlled by at least one exhaust valve 8. The intake manifold 3 receives fresh air (i.e. air originating from the outside environment) via a throttle valve 9 that is adjustable between a closed position and a maximally open position. The exhaust manifold 6 leads to an exhaust system 10 equipped with one or more catalytic converters (not shown in detail) in order to discharge into the atmosphere the gases produced by combustion in the cylinders 2; at least one mixture concentration gauge 11 is arranged in the exhaust system 10 (in particular a lambda probe 11).

Four injectors 12 (one for each cylinder 2) are coupled to the respective intake ducts 4 in order to inject petrol cyclically into said intake ducts 4; according to another embodiment (not shown), the injectors 12 inject the fuel directly into the cylinders 2. Four spark plugs 13 (one for each cylinder 2) are coupled to the respective cylinders 2 in order to bring about cyclically the ignition of the mixture present inside said cylinders 2; obviously, in the case of a diesel-fuelled internal combustion engine 1, the spark plugs 13 are not present.

Each cylinder 2 is coupled to a respective piston 14, which is capable of sliding linearly along the cylinder 2 and is mechanically connected to a cranked crankshaft 15 by means of a connecting rod 16; in turn, the crankshaft 15 is mechanically connected to a gearbox 17 by means of an interposed clutch 18 in order to transmit drive torque to the drive wheels of the motor vehicle (not shown). The crankshaft 15 is mechanically connected to an electric machine 19 that is connected electrically to a battery 20 and is capable of acting both as an electric starter motor in order to set the crankshaft 15 in rotation and as an electric generator in order to recharge said battery 20.

The engine 1 comprises an engine control unit 21, which is capable of supervising the operation of the engine 1. In particular, the engine control unit 21 is capable of managing the starting of the engine 1, in which the electric motor 19 sets the crankshaft 15 in rotation from an initial position P in which said crankshaft 15 is stationary; as soon as the crankshaft 15 begins to rotate, fuel is injected into the cylinders 2 in order to attempt to achieve a first explosion in the shortest possible time and so enable the internal combustion engine 1 to become self-sustaining.

Furthermore, the engine control unit 21 implements the "stop-and-start" mode, which provides for the internal combustion engine 1 to be turned off when the vehicle is stationary or nearly stopped, typically for reasons associated with traffic, such as a red traffic light or a junction that does not have priority, and for the internal combustion engine 1 to be restarted as soon as the driver presses on the accelerator. More generally, the "stop-and-start" mode provides for the internal combustion engine 1 to be turned off even when the vehicle is moving at low speed if the driver does not require traction, i.e. if he/she releases the accelerator pedal. In other words, the "stop-and-start" mode provides for the internal combustion engine 1 to be turned off when it is considered unnecessary to produce any drive torque for a sufficiently long time interval, and for the internal combustion engine 1 to be started when the generation of drive torque is required.

The engine control unit 21 controls an electric motor (not shown in detail), which actuates a fuel pump 22 that draws the fuel from a tank 23 and supplies the fuel under pressure to the injectors 12. In the case of an internal combustion engine 1 with direct fuel injection, a further high-pressure fuel pump is normally provided, which is mechanically connected to the crankshaft 15 and is directly actuated by rotation of said crankshaft 15. The engine control unit 21 furthermore controls an electric heater 24 for the lambda probe 11, and an electric fan 25 coupled to a radiator 26 with liquid coolant for the engine 1.

Figure 2:
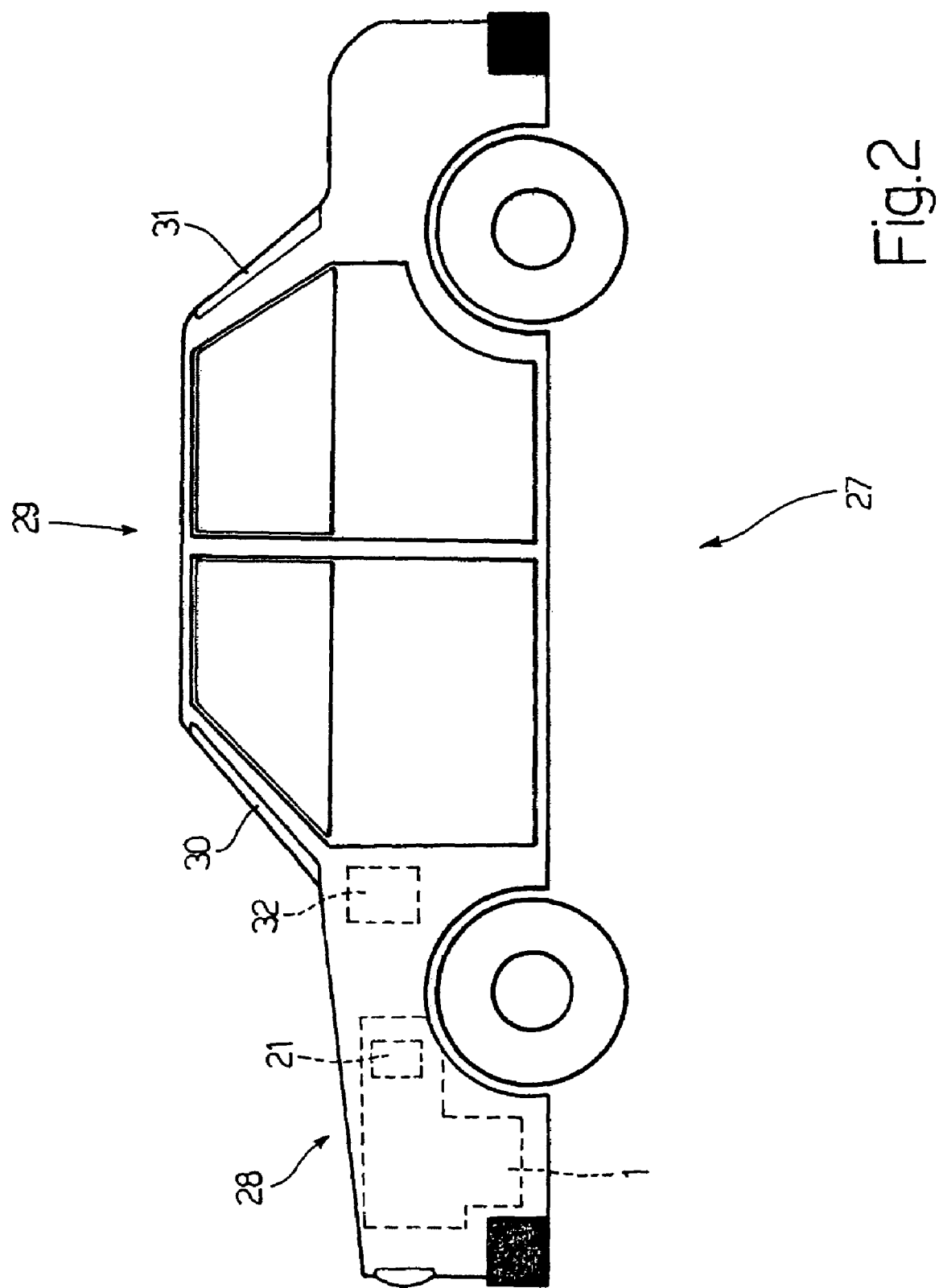
FIG. 2 is a schematic view of a motor car equipped with the engine of FIG. 1 and provided with an electronic control unit that implements the management method that is the subject-matter of the present invention.

FIG. 2 shows a motor car 27 that comprises a bonnet 28 arranged at the front and accommodating the internal combustion engine 1 shown in FIG. 1. The motor car 27 furthermore comprises a passenger compartment 29 delimited at the front by a front window or windscreen 30 and at the rear by a rear window 31. Within the passenger compartment 29, there are provided a plurality of electrical consumers (not shown in detail), the function of which is not essential to safety or to the running of the motor car 27 and is essentially associated with ensuring a high level of comfort for the driver and/or passengers; by way of example, such electrical consumers can comprise the air conditioning system, car radio, courtesy lights, electric seat adjustment, electric windows, electric rear-view mirror adjustment, cigarette lighter or satellite navigation system.

According to a preferred embodiment, the electrical consumers of the passenger compartment 29 are controlled by a passenger compartment control unit 32, which is in communication with the engine control unit 21 and, if necessary, is capable of shutting off the electrical supply to the electrical consumers of the passenger compartment 29 and/or of supplying the electrical consumers of the passenger compartment 29 at reduced power (for example by dimming the courtesy lights or muting the car radio). As a general rule, any electrical consumers (for example car radio and satellite navigation system) that require continuity of electrical supply owing to the presence of complex electronic components are supplied at reduced power. Alternatively, the electrical consumers that require continuity of electrical supply can also be supplied by a further backup battery (not shown), which is independent of the battery 20.

Apart from the electrical consumers described above, the motor car 27 is equipped with other electrical consumers (not shown in detail), which can be controlled by the engine control unit 21 or by other control units (not shown); such further electrical consumers generally have a function that is useful or essential to safety or to the running of the motor car 27. By way of example, such further electrical consumers can comprise the front and rear lights, indicator lights, horn, electrically controlled power steering, electrically controlled power brakes, electronic driving assistance devices (ABS, ASR etc.).

As stated previously, the engine control unit 21 implements the "stop-and-start" mode, and therefore the engine control unit 21 has to decide when to enable and when to disable said "stop-and-start" mode. To this end, a state of charge (SOC) of the battery 20 is determined, a state of motion of the crankshaft 15 is determined and the electric power consumed overall by the electrical consumers of the motor vehicle 27 is determined; it is then decided to enable or disable the "stop-and-start" mode as a function of the state of charge SOC of the battery 20, as a function of the state of motion of the crankshaft 15, and as a function of the electric power consumed overall by the electrical consumers of the motor vehicle 27.

The state of charge SOC of the battery 20 is generally stated as a percentage relative to the maximum possible charge of said battery 20; furthermore, the state of charge SOC of the battery 20 is determined by means of an appropriate sensor or by means of an estimate, which is usually based on the voltage present at the terminals of the battery 20, on the current delivered by the battery 20 and, if appropriate, on the internal temperature of the battery 20 and on the internal pH of the battery 20. The state of motion of the crankshaft 15 provides for one of the following alternatives to be determined: the crankshaft 15 is stationary, the crankshaft 15 is in the starting phase, the crankshaft 15 is in rotation but is not capable of being self-sustaining, the crankshaft 15 is in rotation and capable of being self-sustaining, the crankshaft 15 is in the stopping phase.

If the crankshaft 15 is stationary or in the stopping phase, then the pressure value in a fuel injection circuit is periodically checked and, on the basis of the pressure value in the fuel injection circuit, signals are given to switch the fuel pump 22 on or off; in particular, the fuel pump 22 is switched off if the pressure value in the injection circuit is greater than a first predetermined threshold value and the fuel pump 22 is switched on if the pressure value in the injection circuit is below a second predetermined threshold value. Furthermore, if the crankshaft 15 is stationary or in the stopping phase, then the heater 24 for the mixture concentration gauge 11 in the exhaust system 10 is operated at low power in such a manner as to ensure a predetermined minimum temperature. Finally, if the crankshaft 15 is stationary or in the stopping phase, then the electric fan 25 coupled to the liquid coolant radiator 26 is operated at low power in such a manner as to ensure a predetermined maximum temperature.

If the crankshaft 15 is in the starting phase, then a signal is given to switch on the fuel pump 22, the electric fan 25 coupled to the liquid coolant radiator 26 is operated at low power in such a manner as to ensure a predetermined maximum temperature, and the heater 24 for the mixture concentration gauge 11 in the exhaust system 10 is operated at nominal power. According to a preferred embodiment, if the crankshaft 15 is in the starting phase, then any electrical consumers that are not essential to safety or to the running of the motor vehicle 27 are operated at reduced power or are switched off.

If the crankshaft 15 is in rotation and capable of being self-sustaining, then the fuel pump 22 is operated at nominal power, the electric fan 25 coupled to the liquid coolant radiator 26 is operated at nominal power, and the heater 24 for the mixture concentration gauge 11 in the exhaust system 10 is operated at nominal power. Furthermore, if the crankshaft 15 is in rotation and capable of being self-sustaining, the state of charge SOC of the battery 20 is assessed in order to decide whether to enable or disable "stop-and-start" mode.

When the crankshaft 15 is in rotation and capable of being self-sustaining, if the state of charge SOC of the battery 20 is between a lower battery threshold value and an upper battery threshold value, then "stop-and-start" mode is enabled, the electric machine 19 is controlled in order to perform normal recharging of the battery 20, and regenerative braking mode, if present, is enabled.

When the crankshaft 15 is in rotation and capable of being self-sustaining, if the state of charge SOC of the battery 20 is greater than the upper battery threshold value, then "stop-and-start" mode is enabled, the electrical energy generator 19 is controlled in order to suspend recharging of the battery 20, and regenerative braking mode, if present, is disabled.

When the crankshaft 15 is in rotation and capable of being self-sustaining, if the state of charge SOC of the battery 20 is below the lower battery threshold value, then "stop-and-start" mode is disabled, the electrical energy generator 19 is controlled in order to perform maximum possible recharging of the battery 20 regenerative braking mode, if present, is enabled, and any electrical consumers that are not essential to safety or to the running of the motor vehicle 27 are operated at reduced power or are switched off.

In other words, when the crankshaft 15 is in rotation and capable of being self-sustaining, the aim is to keep the state of charge SOC of the battery 20 within the range between the lower battery threshold value and the upper battery threshold value.

Preferably, the state of charge SOC of the battery 20 corresponding to the lower battery threshold value is greater than the state of complete discharge of the battery 20 and is, for example, equal to 20% of maximum charge; said choice is made in order to allow the battery 20 always to have a certain reserve of energy in such a manner to ensure, as always and with a sufficient safety margin, at least one start of the internal combustion engine 1.

Preferably, the state of charge SOC of the battery 20 corresponding to the upper battery threshold value is less than the maximum possible value corresponding to the fully charged battery 20 and is, for example, equal to 80% of maximum charge; said choice is made in order to allow the battery 20 always to be able to absorb a certain amount of electrical energy. In other words, the battery 20 is always available to absorb the amount of charge that can be recovered during braking. Furthermore, some types of batteries (typically nickel-cadmium batteries) are more efficient if their state of charge is between 60 and 90% of maximum charge.

There are, furthermore, some conditions that are periodically checked and may lead to "stop-and-start" mode being disabled irrespective of other factors.

In particular, a state of health SOH of the battery 20 is determined periodically, said state being expressed as % and determined by means of an estimate. If the state of health SOH of the battery 20 is below a predetermined caution threshold value, "stop-and-start" mode is always disabled irrespective of other factors. In other words, "stop-and-start" mode is always disabled if the battery 20 is not in good condition, so as to reduce the overall number of starts and so reduce the load on the battery 20. Furthermore, if the state of health SOH of the battery 20 is below a predetermined alarm threshold value, then the electrical supply to any electrical consumers that are not essential to safety or to the running of the motor vehicle 27 is shut off.

Preferably, at every start, the value of a parameter indicating the quality of start is determined; "stop-and-start" mode is always disabled irrespective of other factors if the mean of recent values of the parameter indicating the quality of start is below a predetermined threshold value. In other words, "stop-and-start" mode is always disabled if the internal combustion engine 1 has exhibited starting problems, in such a manner as to reduce the overall number of starts until such starting problems have been resolved.

According to one possible embodiment, it is preferable to disable "stop-and-start" mode if a maximum defrosting function of a windscreen 30 of the motor vehicle 27 is activated or if a demisting function of a rear window 31 of the motor vehicle 27 is activated; the reason for this is linked to the fact that said maximum defrosting and demisting functions consume large quantities of electrical energy and it is thus good to avoid applying further load to the battery 20 by starting the internal combustion engine 1 repeatedly when said functions are active.

Finally, "stop-and-start" mode is always disabled irrespective of other factors if faults are signalled in components (sensors or actuators) of the internal combustion engine 1 that may prejudice starting of the internal combustion engine 1 or control of pollutant emissions from the internal combustion engine 1 in the starting phase. In particular, "stop-and-start" mode is always disabled irrespective of other factors if a malfunction of the mixture concentration gauge 11 in the exhaust system 10 is signalled, if a condition of incomplete adjustment of mixture concentration is signalled, if a fault in a phase sensor of the internal combustion engine 1 is signalled, if a fault in the injectors 12 of the internal combustion engine 1 is signalled, or if a fault in the ignition coils of the internal combustion engine 1 is signalled.

The above-described method for managing the "stop-and-start" mode has numerous advantages in that it makes it possible to avoid placing excessive load on the battery 20 so increasing the life of the battery 20 and they make it possible to avoid excessive discharge of said battery 20, which excessive discharge could prevent the internal combustion engine 1 from being restarted. Said aim is achieved thanks to optimisation of the use of the electric power generated by the battery 20, so as to avoid having to distribute said electric power among too many simultaneously active electrical consumers.

The invention claimed is:

1. A method for managing the "stop-and-start" mode in a motor vehicle equipped with an internal combustion engine; the method comprises the phases of:
   determining a state of charge (SOC) of a battery of the motor vehicle;
   determining a state of motion of a crankshaft of the internal combustion engine by selecting one of the following alternatives: the crankshaft is stationary, the crankshaft is in the starting phase, the crankshaft is in rotation but is not capable of being self-sustaining, the crankshaft is in rotation and capable of being self-sustaining, and the crankshaft is in the stopping phase;
   determining the electric power consumed overall by the electrical consumers of the motor vehicle; and
   enabling or disabling the "stop-and-start" mode as a function of the state of charge (SOC) of the main battery, as a function of the state of motion of the crankshaft of the engine, and as a function of the electric power consumed overall by the electrical consumers of the motor vehicle.

2. The method according to claim 1, wherein, if the crankshaft is stationary or in the stopping phase, then the pressure value in a fuel injection circuit is periodically checked and, on the basis of the pressure value in the fuel injection circuit, signals are given to switch a fuel pump on and off.

3. The method according to claim 2, wherein the fuel pump is switched off if the pressure value in the injection circuit is greater than a first predetermined threshold value and the fuel pump is switched on if the pressure value in the injection circuit is below a second predetermined threshold value.

4. The method according to claim 1, wherein, if the crankshaft is stationary or in the stopping phase, then a heater for the mixture concentration gauge in an exhaust system is operated at low power in such a manner as to ensure a predetermined minimum temperature.

5. The method according to claim 1, wherein, if the crankshaft is stationary or in the stopping phase, then an electric fan coupled to a liquid coolant radiator is operated at low power in such a manner as to ensure a predetermined maximum temperature.

6. The method according to claim 1, wherein, if the crankshaft is in the starting phase, then a signal is given to switch on a fuel pump, an electric fan coupled to a liquid coolant radiator is operated at low power in such a manner as to ensure a predetermined maximum temperature, and a heater for the mixture concentration gauge in an exhaust system is operated at nominal power.

7. The method according to claim 6, wherein, if the crankshaft is in the starting phase, then any electrical consumers that are not essential to safety or to the running of the motor vehicle are operated at reduced power or are switched off.

8. The method according to claim 1, wherein, if the crankshaft is in rotation and capable of being self-sustaining, then a fuel pump is operated at nominal power, an electric fan coupled to a liquid coolant radiator is operated at nominal power, and a heater for the mixture concentration gauge in an exhaust system is operated at nominal power.

9. The method according to claim 1, wherein, if the crankshaft is in rotation and capable of being self-sustaining and the state of charge (SOC) of the battery of the motor vehicle is between a lower battery threshold value and an upper battery threshold value, then "stop-and-start" mode is enabled, an electrical energy generator is controlled in order to perform normal recharging of the battery, and regenerative braking mode, if present, is enabled.

10. The method according to claim 9, wherein the state of charge (SOC) of the battery of the motor vehicle corresponding to the upper battery threshold value is less than the maximum possible value corresponding to the fully charged battery.

11. The method according to claim 1, wherein, if the crankshaft is in rotation and capable of being self-sustaining and the state of charge (SOC) of the battery of the motor vehicle is greater than an upper battery threshold value, then "stop-and-start" mode is enabled, an electrical energy generator is controlled in order to suspend recharging of the battery, and regenerative braking mode, if present, is disabled.

12. The method according to claim 11, wherein the state of charge (SOC) of the battery of the motor vehicle corresponding to the upper battery threshold value is less than the maximum possible value corresponding to a fully charged battery.

13. The method according to claim 1, wherein, if the crankshaft is in rotation and capable of being self-sustaining and the state of charge (SOC) of the battery of the motor vehicle is below a lower battery threshold value, then "stop-and-start" mode is disabled, an electrical energy generator is controlled in order to perform maximum possible recharging of the battery and regenerative braking mode, if present, is enabled.

14. The method according to claim 13, wherein, if the crankshaft is in rotation and capable of being self-sustaining and the state of charge (SOC) of the battery of the motor vehicle is below a lower battery threshold value, then any electrical consumers that are not essential to safety or to the running of the motor vehicle are operated at reduced power or are switched off.

15. The method according to claim 1, wherein "stop-and-start" mode is disabled irrespective of other factors if a maximum defrosting function of a windscreen of the motor vehicle is activated.

16. The method according to claim 1, wherein "stop-and-start" mode is disabled irrespective of other factors if a demisting function of a rear window of the motor vehicle is activated.

17. The method according to claim 1, wherein "stop-and-start" mode is disabled irrespective of other factors if a malfunction of the mixture concentration gauge in an exhaust system is signaled.

18. The method according to claim 1, wherein "stop-and-start" mode is disabled irrespective of other factors if a condition of incomplete adjustment of mixture concentration is signaled.

19. The method according to claim 1, wherein "stop-and-start" mode is disabled irrespective of other factors if faults in the sensors and/or actuators of the internal combustion engine are signaled that may have a negative impact on the control of pollutant emissions during starting of the engine.

20. The method according to claim 19, wherein "stop-and-start" mode is disabled irrespective of other factors if a fault in a phase sensor of the internal combustion engine is signaled.

21. The method according to claim 19, wherein "stop-and-start" mode is disabled irrespective of other factors if a fault in the injectors of the internal combustion engine is signaled.

22. The method according to claim 19, wherein "stop-and-start" mode is disabled irrespective of other factors if a fault in the ignition coils of the internal combustion engine is signaled.

* * * * *